US008631125B2

(12) United States Patent
Lemus

(10) Patent No.: US 8,631,125 B2
(45) Date of Patent: Jan. 14, 2014

(54) NETWORK DEVICE AND MOBILE DEVICE WITH STATE CAPTURE SERVICES

(75) Inventor: Anthony Marco Lemus, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 133 days.

(21) Appl. No.: 13/214,328

(22) Filed: Aug. 22, 2011

(65) Prior Publication Data

US 2013/0054775 A1    Feb. 28, 2013

(51) Int. Cl.
*G06F 15/173*    (2006.01)

(52) U.S. Cl.
USPC ............................ 709/224; 719/318; 709/203

(58) Field of Classification Search
USPC ............ 709/224, 203; 715/744–746; 719/318
See application file for complete search history.

(56) References Cited

U.S. PATENT DOCUMENTS

| 7,734,724 B2 * | 6/2010 | Rezvani et al. ............... 709/219 |
| 8,219,121 B2 * | 7/2012 | Sim et al. ...................... 455/458 |
| 8,301,765 B2 * | 10/2012 | Goodman ..................... 709/224 |
| 2009/0209274 A1 * | 8/2009 | Sangberg et al. ............. 455/462 |
| 2012/0220308 A1 * | 8/2012 | Ledlie ........................ 455/456.1 |

* cited by examiner

*Primary Examiner* — Frantz Jean

(57) ABSTRACT

A method and system for identifying a trigger event for capturing state information of a user device; capturing the state information upon an identified occurrence of the trigger event; storing the state information in another device; obtaining the state information by another user device; and configuring the other user device based on the state information.

20 Claims, 10 Drawing Sheets

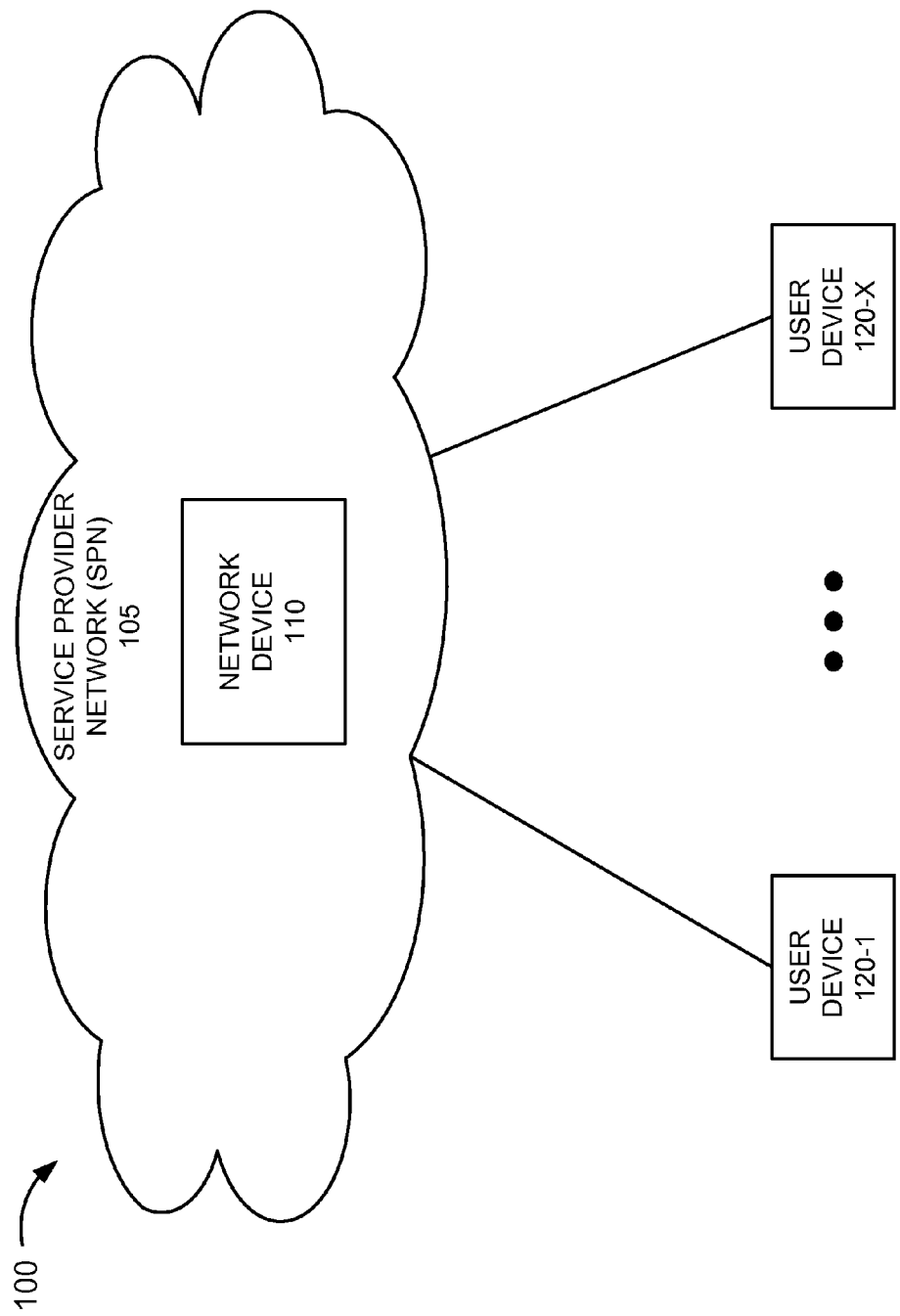

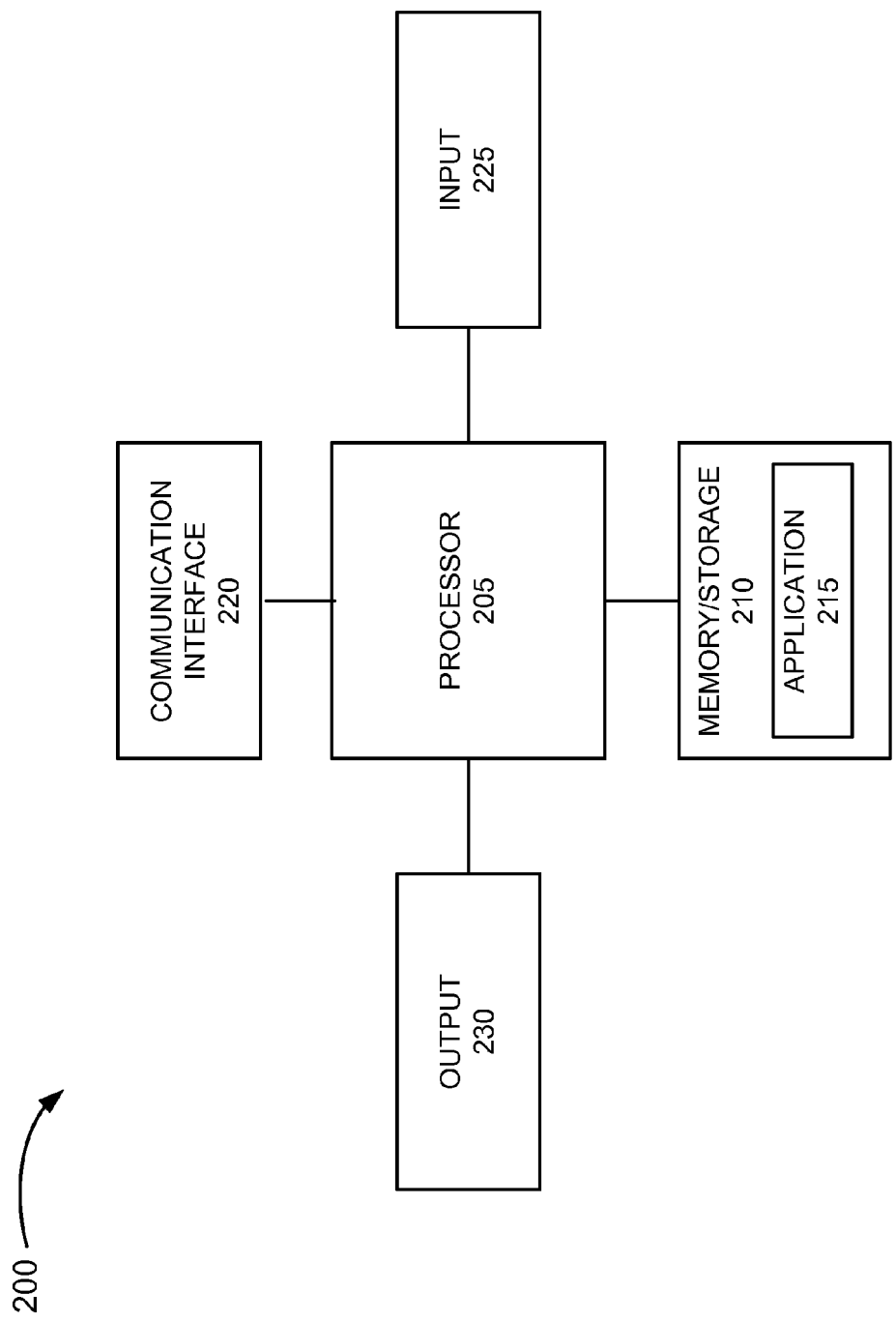

NETWORK DEVICE AND MOBILE DEVICE WITH STATE CAPTURE SERVICES

BACKGROUND

Mobile devices, such as mobile phones, smart phones, tablets, and other portable devices, are pervasive among consumers. In addition to the popularity of mobile devices, other devices are being developed to enhance the consumer's experience. For example, docking stations are beginning to gain popularity among consumers. Typically, a docking station will charge the mobile device. The docking station may also provide other features, such as, speakers for playback of music or games, a radio, etc.

BRIEF DESCRIPTION OF THE DRAWINGS

FIG. 1A is a diagram illustrating an exemplary environment in which an exemplary embodiment of devices that provide state capture services may be implemented;

FIG. 2 is a diagram illustrating exemplary components of a device that may correspond to one or more of the devices in the environment depicted in FIG. 1;

DETAILED DESCRIPTION OF PREFERRED EMBODIMENTS

Figure 1B:
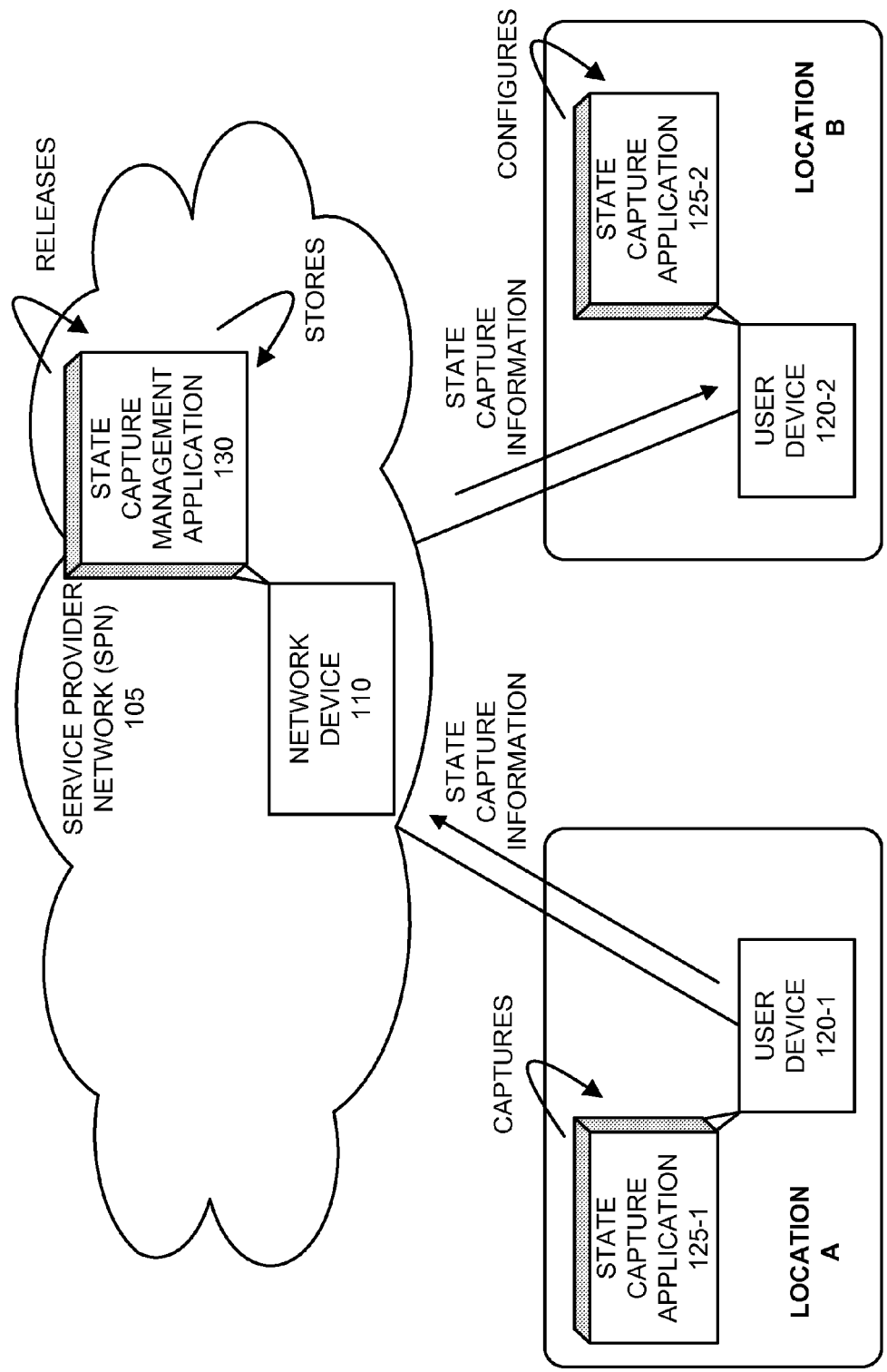
FIG. 1B is a diagram illustrating an exemplary process pertaining to state capture services.

The following detailed description refers to the accompanying drawings. The same reference numbers in different drawings may identify the same or similar elements. Also, the following detailed description does not limit the invention.

According to an exemplary embodiment, a user device captures state information associated with the user device. According to an exemplary embodiment, the user device includes a state capture application (or a state capture program) that runs as a background service during the operation of the user device. The state capture application may invoke a state capture of the user device based on a triggering event. For example, a triggering event may be a timer-based event (e.g., a periodic time interval). Additionally, or alternatively, a triggering event may be a user-input event. For example, the user-input event may occur when a user input is received to invoke a save, to send an e-mail, to perform a navigation function, a shutdown input or a power-down input, etc.

The term "state capture information" or "state information," as used herein, is intended to be broadly interpreted and to include the customary and ordinary meaning afforded it in the arts. In general, state capture information or state information corresponds to information representative of a state of a device (e.g., a user device). The state capture information or state information includes, for example, the state of application(s) running, data associated with the application(s) running (e.g., application settings, configuration of application, files associated the application (e.g., user data files, etc.), etc.), window-based states (e.g., opened, minimized, position, size, etc.), etc.

According to an exemplary embodiment, the state capture application includes a user interface to permit a user to set user preferences. The user preferences may pertain to state capture and other services pertaining to state capture information, as described further below.

According to an exemplary embodiment, the user device transmits state capture information to a network device. The network device stores the state information and makes the state information available to a user device. The user device that obtains the state information may be the same user device associated with the state information or the user device may be a different user device. For example, a user may operate a user device at one location (e.g., at work) and store the state information on the network device. Concurrently or subsequently, a different user device located at a different location (e.g., at home) or the same location (e.g., at work) may obtain the state information from the network device and use the state information to configure the user device at the different or the same location.

Additionally, according to an exemplary embodiment, the state capture application permits different degrees of state capture. For example, the state capture information may include an entire state capture of the user device or may include less than the entire state of the user device. The degree of state capture may depend on user preferences, the commonality of applications between user devices when the state information is used between different user devices, and other factors described further below.

According to an exemplary embodiment, a network device manages the storage and the release of the state capture information to a user device. According to an exemplary embodiment, the network device provides conversion or normalization services pertaining to the state capture information when, for example, user devices differ in operating systems, in application(s), etc., as described further below.

According to an exemplary embodiment, the state capture application captures state information of a user device and the state capture information is stored on a mobile device rather than on the network device. For example, the state capture application stores the state capture information on the mobile device via a docking station or directly via some connection (e.g., a Universal Serial Bus (USB cable), etc.) between the mobile device and the user device. In this way, the state capture information becomes a portable asset that the user may use for the same user device or some other user device.

FIG. 1A is a diagram illustrating an exemplary environment in which an exemplary embodiment of devices that provide state capture services may be implemented. As illustrated in FIG. 1A, an environment 100 may include a service provider network (SPN) 105 that includes, among other devices, a network device 110. Additionally, environment 100 includes user devices 120-1 through 120-X (referred to as user device 120 or user devices 120) in which X>1.

The number of devices and networks, and the configuration in environment 100 are exemplary and provided for simplicity. According to other embodiments, environment 100 may include additional devices, fewer devices, different devices, and/or differently arranged devices, than those illustrated in FIG. 1A. For example, according to an embodiment, environment 100 may include a single user device 120.

According to other embodiments, a single device may be implemented as multiple devices and/or multiple devices may be implemented as a single device. A device may be implemented according to a centralized computing architecture or a distributed computing architecture. Additionally, a device may be implemented according to one or multiple network architectures (e.g., a client device, a server device, a peer device, or a combination thereof).

Additionally, or alternatively, environment 100 may include additional networks and/or differently arranged networks, than those illustrated in FIG. 1A. For example, environment 100 may include a local area network (LAN) and/or other types of network(s), such as a network provider network, a content provider network, the Internet, etc. Also, according to other embodiments, one or more functions and/or processes described as being performed by a particular device may be performed by a different device, or some combination of devices.

Environment 100 may be implemented to include wired and/or wireless connections among the devices illustrated. By way of example, user devices 120 may wirelessly connect to service provider network 105, via a wired connection (e.g., optically, cable, etc.), or a combination thereof.

Service provider network 105 includes a network that makes Internet service available. According to such an embodiment, service provider network 105 may include a data network, a packet-switched network, an Internet Protocol (IP) network, or other suitable network. Service provider network 105 may correspond to a satellite-based network and/or a terrestrial-based network. Although not illustrated, service provider network 105 may include, for example, billing devices, application servers, security devices, routing devices, etc. Service provider network 105 may also provide other types of services, such as mobile service. For example, service provider network 105 may include a wireless network (e.g., a $3^{rd}$ generation network, a $4^{th}$ generation network, a public land mobile network (PLMN), a cellular network, etc.).

Network device 110 includes one or multiple network devices that provide state capture services, as described herein. Network device 110 may take the form of a computational device (e.g., a Web server, a server, an application server, a computer).

According to an exemplary embodiment, network device 110 stores state capture information and makes the state capture information available to user devices. According to an exemplary embodiment, network device 110 stores user preference information, which may be included in a state capture information message transmitted by user device 120 to network device 110, or obtained during a user registration process between the user via user device 120 and network device 110.

Network device 110 may provide other state capture services. For example, network device 110 may convert state capture information into common or normalized data so that user devices having different applications, different versions of the same application, using different operating systems, etc., may use the state capture information. By way of example, user devices having different applications may include one user device having an Internet Explorer® web browser and another user device having another web browser, such as, a Firefox® web browser, a Google Chrome® web browser, or an Opera® web browser. According to another example, user devices having different versions of the same application may include one user device having Microsoft Word® 2010 and another user device having Microsoft Word® 2007 or Microsoft Word® 2003. According to this example, while versions of Microsoft® Word offer forward and backward compatibility options, in the event that a file is saved in a format that is not forward compatible or backward compatible, network device 110 may provide a compatibility service for a user. According to another example, user devices having different operating systems may include one user device resident with a Windows® operating system and another device resident with a Mac® operating system or an Android® operating system. Network device 110 is described further below.

User device 120 includes a computational device having communication capability. For example, user device 120 may include a computer (e.g., a desktop computer, a laptop computer, a palmtop computer, etc.), a tablet device, or a mobile device (e.g., a smartphone, a personal digital assistant (PDA), etc.). According to an exemplary embodiment, user device 120 includes a state capture application.

FIG. 1B is a diagram illustrating an exemplary process pertaining to state capture services. According to an exemplary scenario, assume a user is using user device 120-1 at location A. As illustrated, user device 120-1 includes a state capture application 125-1. During the period of operation, up to shutdown or power-down, one or more triggering events occur for state capture. State capture application 125-1 captures state information based on the occurrence of the one or more triggering events. According to this example, assume that state capture application 125-1 captures all state information and stores the state capture information as one or more files.

According to this scenario, during the shutdown or power-down process of user device 120-1, state capture application 125-1 communicates with network device 110. For example, state capture application 125-1 generates a state capture information message and transmits the state capture information message to network device 110. As illustrated, network device 110 includes a state capture management application 130. State capture management application 130 stores the state capture information included in the state capture information message. For example, network device 110 stores the state capture information in a database (not illustrated) based on a user identifier and/or a device identifier.

Subsequent thereto, the user moves to a location B and is using user device 120-2 that includes state capture application 125-2. During a start-up or a power-up process of user device 120-2, state capture application 125-2 generates a state capture information message and transmits the state capture information message to network device 110. The state capture information message includes a user identifier and/or a device identifier.

Upon receipt of the state capture information message, state capture management application 130 releases the state capture information associated with user device 120-1. For example, state capture management application 130 identifies the state capture information to be released based on the user identifier and/or device identifier. State capture management application 130 generates a state capture information response that includes the state capture information and transmits the state capture information to user device 120-2. As illustrated, once the state capture information is received, state capture application 125-2 configures user device 120-2 based on the state capture information. In this example, it is assumed that user device 120-2 includes the same application(s) and operating system as user device 120-1.

According to other examples, the user may use the same user device 120. For example, a user uses user device 120-1 one day and returns the next day such that user device 120-1 is restored to the state of the previous day. According to other examples, the state capture information may not correspond to the entire state of user device 120-1. According to even other examples, user device 120-1 and user device 120-2 may not include identical applications, etc., as previously described.

Figure 1C:
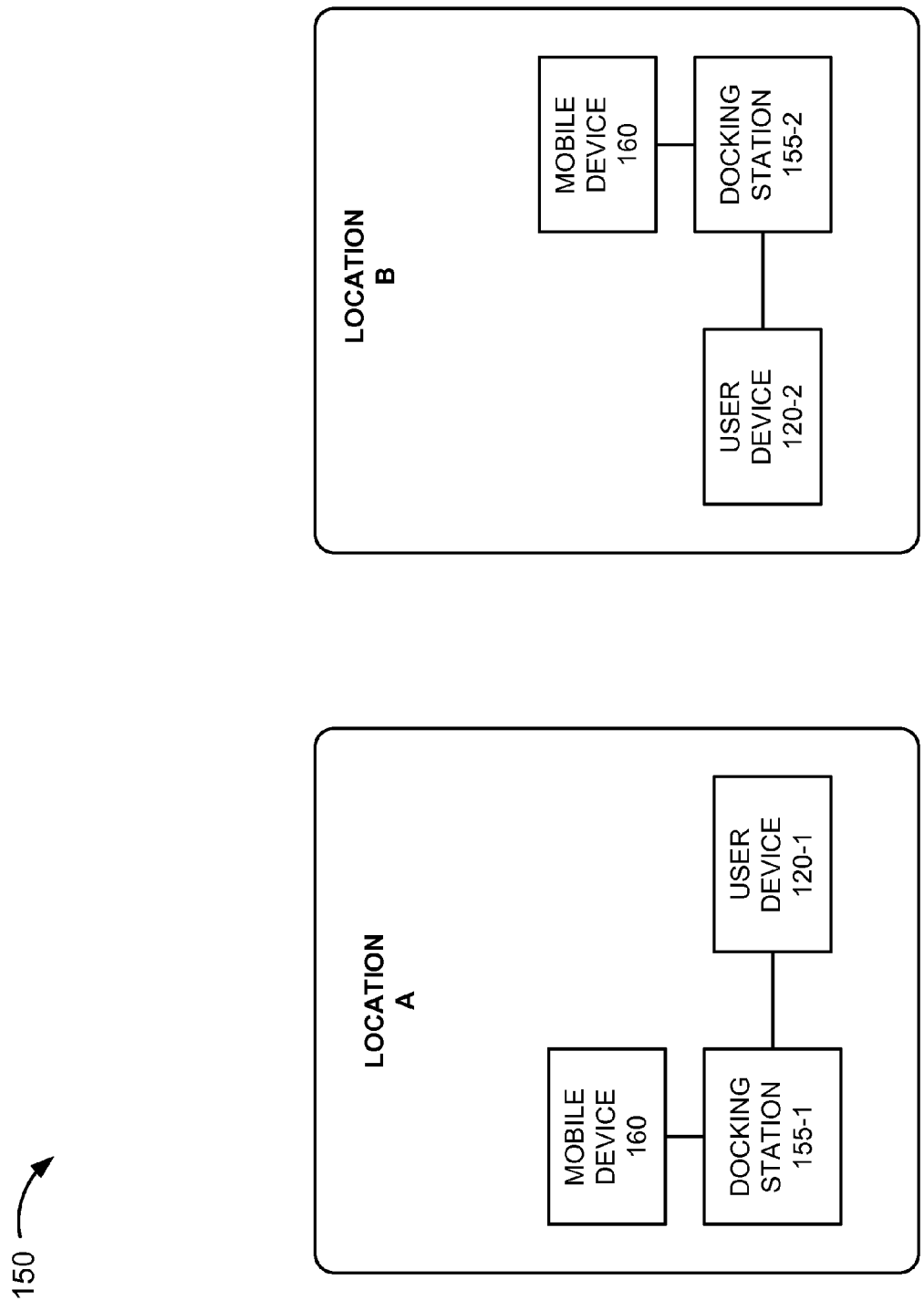
FIG. 1C is a diagram illustrating another exemplary environment in which an exemplary embodiment of devices that provide state capture services may be implemented.

FIG. 1C is a diagram illustrating another exemplary environment in which an exemplary embodiment of devices that provide state capture services may be implemented. As illustrated in FIG. 1C, an environment 150 includes user devices 120, as previously described, docking stations 155-1 and 155-2 (referred to as docking stations 155 or docking station 155), and mobile device 160.

The number of devices and the configuration in environment 150 are exemplary and provided for simplicity. According to other embodiments, environment 150 may include additional devices, fewer devices, different devices, and/or differently arranged devices, than those illustrated in FIG. 1C. For example, according to other embodiments, docking station(s) 155 may not be used. A device may be implemented according to various network architectures (e.g., a client device, a server device, a peer device, or a combination thereof).

Also, according to other embodiments, one or more functions and/or processes described as being performed by a particular device may be performed by a different device, or some combination of devices. Environment 150 may include wired and/or wireless connections among the devices illustrated.

Docking station 155 includes a device configured to physically receive mobile device 160. For example, docking station 155 includes a docking port for mobile device 160. According to an exemplary embodiment, when mobile device 160 is docked with docking station 155, mobile device 160 may be communicatively coupled to user device 120 and docking station 155. According to another embodiment, mobile device 160 may be communicatively coupled to user device 120 and/or docking station 155 based on a wireless connection. According to an embodiment, docking station 155 is connectable to user device 120 via a wired connection. According to another embodiment, docking station 155 is connectable to user device 120 via a wireless connection (e.g., Bluetooth, Near Field Communication (NFC), etc.).

Mobile device 160 includes a handheld device or a portable device. Mobile device 160 may include, for example, a smartphone, a tablet device, a PDA, a palmtop computer, or some other type of mobile device. Mobile device 160 may take the form of a computational device and/or a communication device.

Figure 1D:
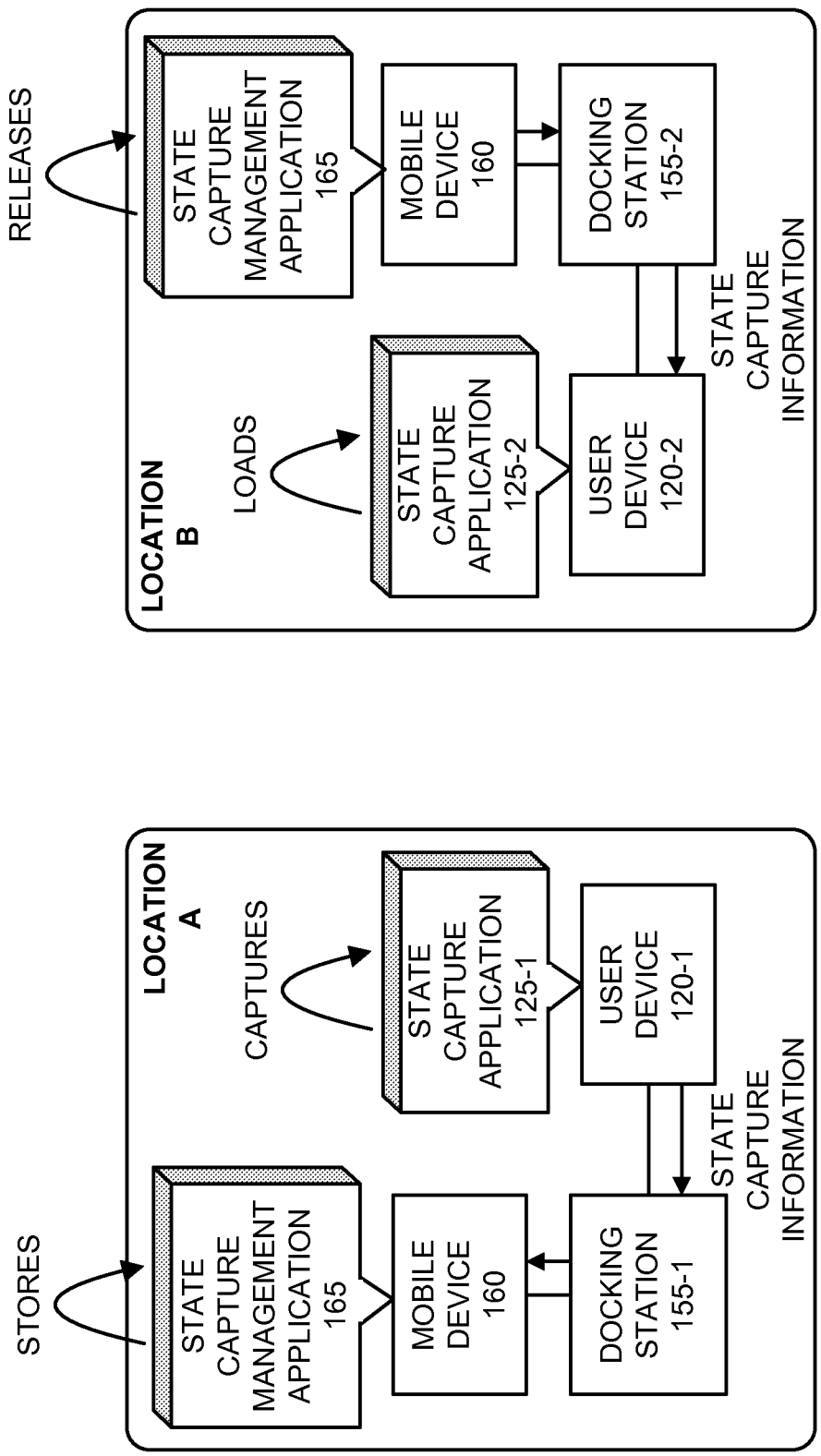
FIG. 1D is a diagram illustrating another exemplary process pertaining to state capture services.

FIG. 1D is a diagram illustrating another exemplary process pertaining to state capture services. According to an exemplary scenario, assume a user is using user device 120-1 at location A. As illustrated, user device 120-1 includes a state capture application 125-1.

According to this scenario, the user decides to store state capture information on mobile device 160. The user connects docking station 155-1 and mobile device 160 to user device 120-1. The user initiates a state capture (e.g., via state capture application 125-1) and selects mobile device 160 as the target device to save the state capture information. In this example, assume that not all state capture information is captured. Rather, state capture application 125-1 captures state information pertaining to an application, data, and window parameters associated with the application (e.g., size, position, etc.).

Upon capture of state information, state capture application 125-1 communicates with mobile device 160 via state capture management application 165. State capture management application 165 stores the state capture information.

Subsequently, the user moves to a location B and is using user device 120-2 that includes state capture application 125-2. The user also connects docking station 155-2 and mobile device 160 with user device 120-2. According to this scenario, assume that the user powers on user device 120-2 and state capture application 125-2 begins to run (e.g., as a background service). State capture application 125-2 also recognizes the presence of mobile device 160 and state capture management application 165.

According to this scenario, the user launches the same application as was previously launched on user device 120-1. State capture application 125-2 interprets the launching of the application as a triggering event (e.g., based on user preferences or user history) and communicates with mobile device 160 to obtain the state capture information stored by mobile device 160. Based on the communication with user device 120-2, state capture management application 165 releases the state capture information. Once the state capture information is received, state capture application 125-2 configures user device 120-2 based on the state capture information.

FIG. 2 is a diagram illustrating exemplary components of a device 200 that may correspond to one or more of the devices in environments 100 and 150. For example, device 200 may correspond to network device 110, user device 120, and mobile device 160. As illustrated, according to an exemplary embodiment, device 200 may include a processor 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processor 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, etc.), may include one or multiple memories (e.g., memory/storage 210), etc.

Processor 205 may control the overall operation or a portion of operation(s) performed by device 200. Processor 205 may perform one or multiple operations based on an operating system and/or various applications (e.g., application 215). Processor 205 may access instructions from memory/storage 210, from other components of device 200, and/or from a source external to device 200 (e.g., a network, another device, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.) a floppy disk (e.g., a zip disk, etc.), a tape, a Micro-Electromechanical System (MEMS)-based storage medium, and/or a nanotechnology-based storage medium. Memory/storage 210 may include drives for reading from and writing to the tangible storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/storage 210 may store data, application(s), and/or instructions related to the operation of device 200.

Application 215 may include software or a program that provides various services and/or functions. For example, with reference to network device 110 and according to an exemplary embodiment, application 215 may include one or multiple applications or programs (e.g., state capture management application 130) that provide state capture services, as described herein. Additionally, with reference to user device 120 and according to an exemplary embodiment, application 215 may include one or multiple applications or programs (e.g., state capture application 125) that provide state capture services, as described herein. Also, with reference to mobile device 160 and according to an exemplary embodiment, application 215 may include one or multiple applications or programs (e.g., state capture management application 165) that provide state capture services, as described herein.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a camera, a scanner, a microphone, a display, a touchpad, a touchscreen, a touchless screen, a button, a switch, an input port, voice recognition logic, speech recognition logic, fingerprint recognition logic, a web cam, and/or some other type of visual, auditory, tactile, etc., input component. Output 230 may permit an output from device 200. For example, output 230 may include a speaker, a display, a touchscreen, a touchless screen, a light, an output port, and/or some other type of visual, auditory, tactile, etc., output component.

Device 200 may perform processes and/or functions, as described herein, in response to processor 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processor 205 to perform one or more processes described herein. Alternatively, for example, according to other implementations, device 200 may perform one or more processes described herein based on the execution of hardware (processor 205, etc.), the execution of hardware and firmware, or the execution of hardware, software, and firmware.

As previously described, according to an exemplary embodiment, the user may register a device pertaining to state capture services. For example, with reference to environment 100, the user may register a device with network device 110. A description of an exemplary registration process is described.

Figure 3A:
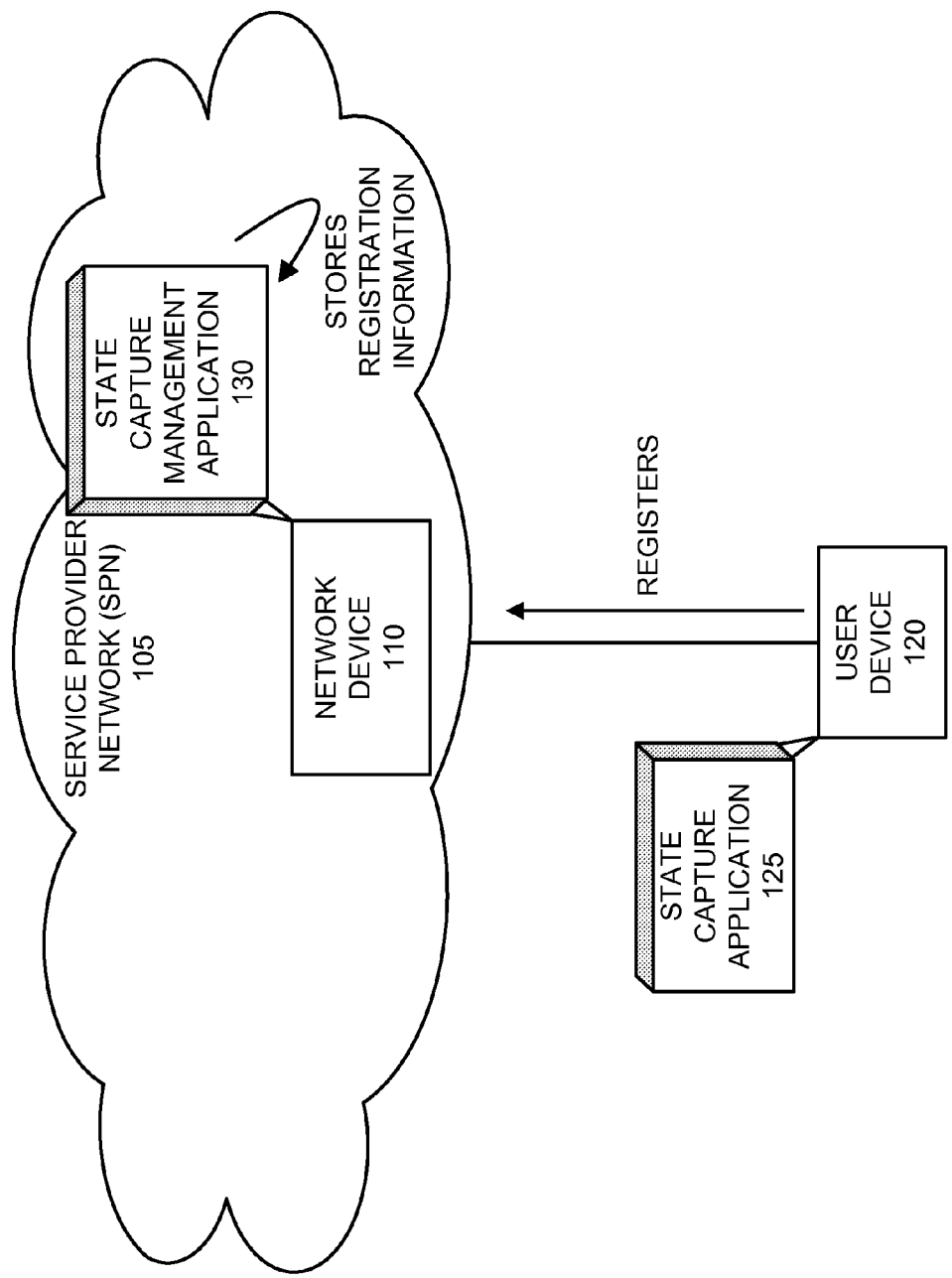
FIG. 3A is a diagram illustrating an exemplary registration process pertaining to state capture services.

FIG. 3A is a diagram illustrating an exemplary registration process pertaining to state capture services. According to this example, as illustrated in FIG. 3A, environment 100 is depicted. According to the exemplary registration process, a user may register user device 120 with network device 110 via state capture application 125. For example, the user may provide some or all of registration information. Alternatively, some of the registration information may be obtained automatically (e.g., a device identifier, etc.). The registration information may be used by network device 110 to create a user account. The registration information may include, for example, a user device identifier (e.g., a name of user device, equipment identifier, network address, etc.), an operating system identifier (e.g., Windows® 7, Windows® Vista, Mac® OS, etc.), and application identifier(s) (e.g., name(s) of application(s), such as Microsoft® Word 2007, Internet Explorer® 8, etc.). The registration information may also include a user name, user login information (e.g., password, etc.), and/or location information associated with a user device (e.g., work, home, etc.). When the registration information is received, network device 110 stores the registration information and uses this information when providing state capture services. For example, network device 110 may store state capture information in a database that correlates a user device and/or a user with state capture information. Additionally, as previously described, network device 110 may convert state capture information into common or normalized data based on user device characteristics (e.g., operating system, application(s), etc.) associated with a source user device and a target user device.

According to an exemplary embodiment, during the registration process, the user may set various user preferences. For example, the user may register multiple user devices 120 and select which user devices 120 are linked (e.g., share state capture information). As an example, a user may use two computers (e.g., one at work and one at home) and two mobile devices (e.g., one for work and one for home), the user may wish to link the two computers and link the two mobile devices to permit the interchange of state capture information.

Additionally, another user preference may pertain to a synchronization service. For example, the user may wish to have the state capture information associated with one user device 120 to be pushed to another user device 120, in real time. For example, assume the user uses a user device 120 at a location A, while connected to network device 110. Concurrently, another user device 120 at a location B is powered on and connected to network device 110. The user may set a user preference so that the state capture information associated with the user device 120 at location A is provided to the other user device 120 at location B, in real-time, via network device 110.

Figure 3B:
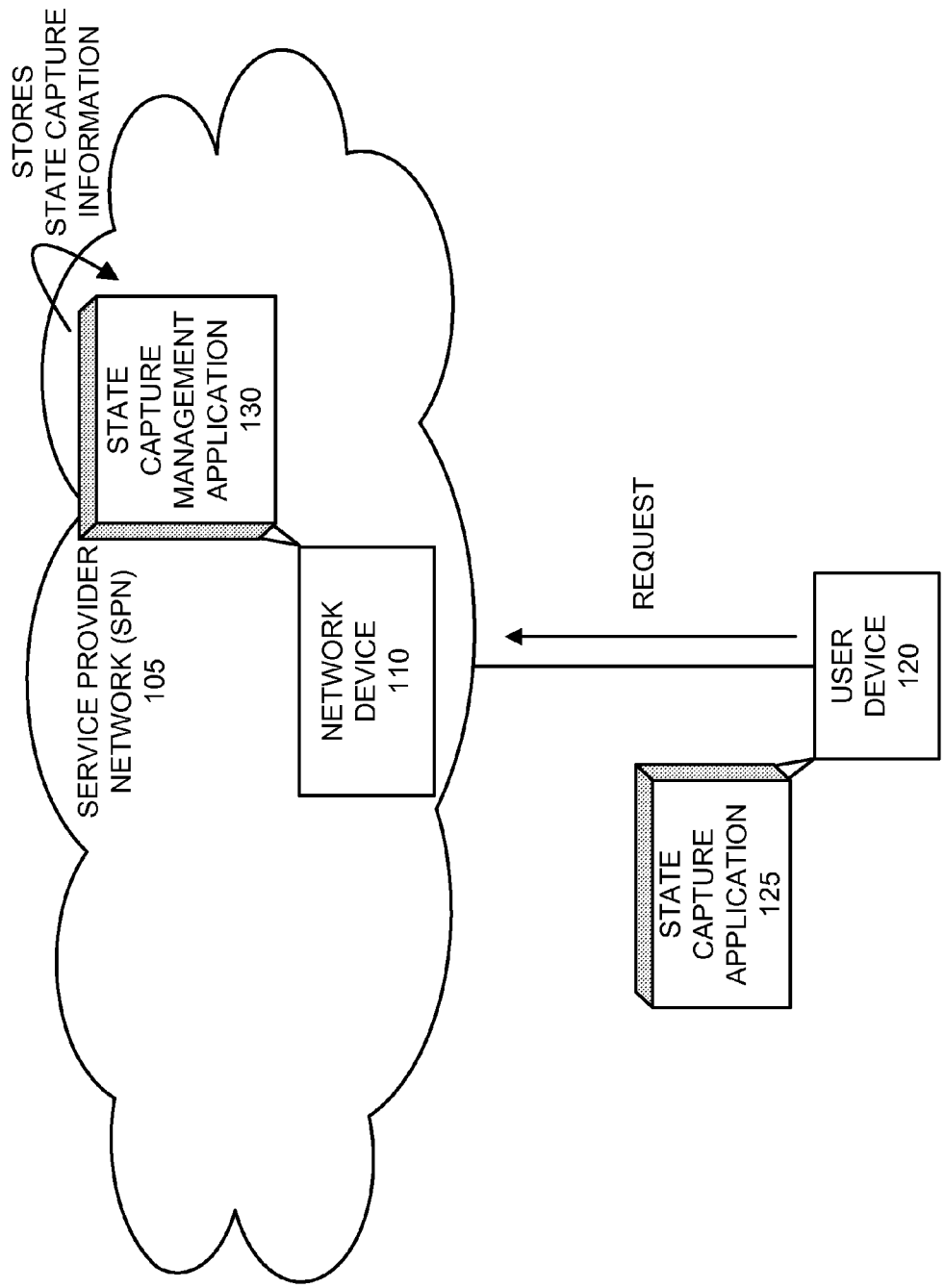
FIGS. 3B and 3C are diagrams illustrating an exemplary process in which user device and network device interact for providing state capture services.
Figure 3C:
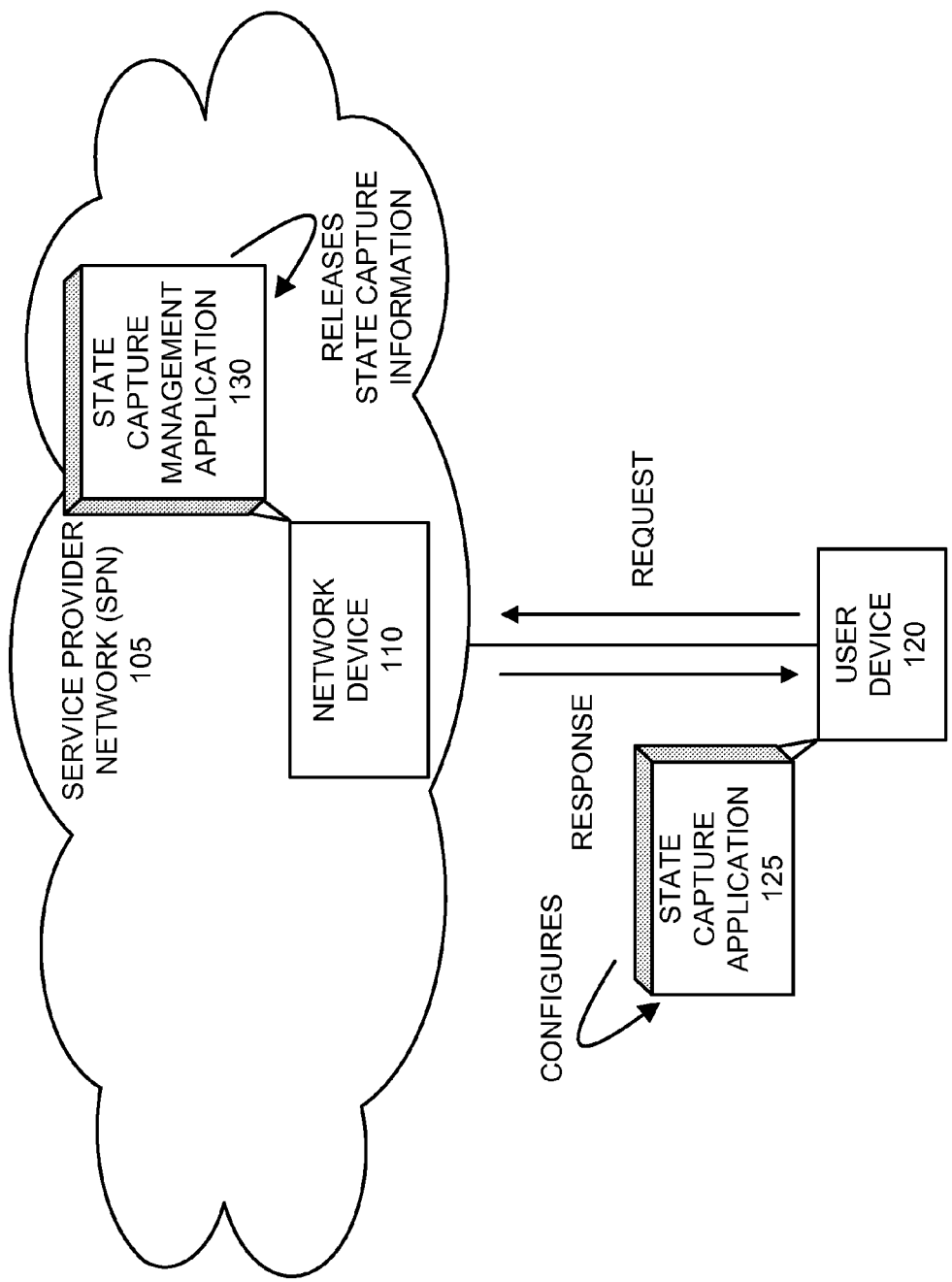

FIGS. 3B and 3C are diagrams illustrating an exemplary process in which user device 120 and network device 110 interact for providing state capture services. According to this example, the process is implemented in environment 100.

According to an exemplary process, when the state capture information is obtained based on a triggering event, user device 120 communicates with network device 110. For example, state capture application 125 generates a request or some other form of a message and communicates the request to network device 110. The request includes the state capture information. The request may also include other types of information. For example, the request may include an identifier (e.g., a user identifier, a source user device identifier, and/or user login information), a target user device identifier (e.g., to indicate a user device 120 with which the state capture information may be shared), and/or a timestamp pertaining to the state capture information. Network device 110 stores the state capture information and other relevant information provided (e.g., in a database).

Referring to FIG. 3C, assume that network device 110 is storing state capture information. A user powers on user device 120. During this time, there are different steps that may occur for user device 120 to obtain the state capture information from network device 110, depending on the particular circumstance, as described further below.

According to an exemplary embodiment, state capture application 125 may obtain the state capture information based on user preferences. For example, a user may set a preference in which state capture application 125 automatically obtains state capture information from network device 110 once state capture application 125 is running. According to such an embodiment, state capture application 125 may query network device 110 to identify whether there is state capture information being stored. If so, network device 110 releases the state capture information to user device 120. According to such a preference, for example, the user may also set a preference directed to particular applications to which state information is to be obtained (i.e., versus obtaining all state capture information).

Another example of a user preference is directed to user input. For example, a user may set a preference to obtain state capture information when the user launches a particular application on user device 120 (e.g., a web browser application, etc.). When such an event occurs, state capture application 125 may request state capture information pertaining to the application from network device 110.

According to another example, the user may set a preference to be prompted as to whether state capture information is to be obtained. In this way, the user may invoke or not invoke state capture services. According to an exemplary implementation, the prompt may require a yes or no response. According to other implementations, the prompt may permit the user to select other options pertaining to the state capture service. For example, the user may select particular state capture information based on location, user device, or timestamp information associated with the state capture information. According to another example, the user may be given an option to obtain partial or full state capture information.

According to another embodiment, user device 120 may obtain the state capture information from network device 110 based on user preferences stored by network device 110. For example, the user may set a preference that when user device 120 connects with network device 110, network device 110 automatically pushes the state capture information to user device 120. According to such an implementation, during the connection process, user device 120 may send a message that includes, for example, a device identifier of user device 120. Network device 110 may store a user preference that includes the device identifier and permit network device 110 to identify user device 120 and release the state capture information.

Referring to FIG. 3C, according to an exemplary embodiment, network device 110 identifies the state capture information (e.g., based on a request, during the connection process, etc.). Network device 110 generates a response that includes the state capture information and transmits the response to user device 120. State capture application 125 configures the state of user device 120 based on the state capture information.

As previously described, network device 110 may provide conversion services pertaining to data included in the state capture information. For example, an application(s) or an operating system on one user device 120 may be different than an application(s) or an operation system on another user device 120. According to such circumstances, network device 110 may convert or normalize the data from the source user device to the target user device.

Figure 3D:
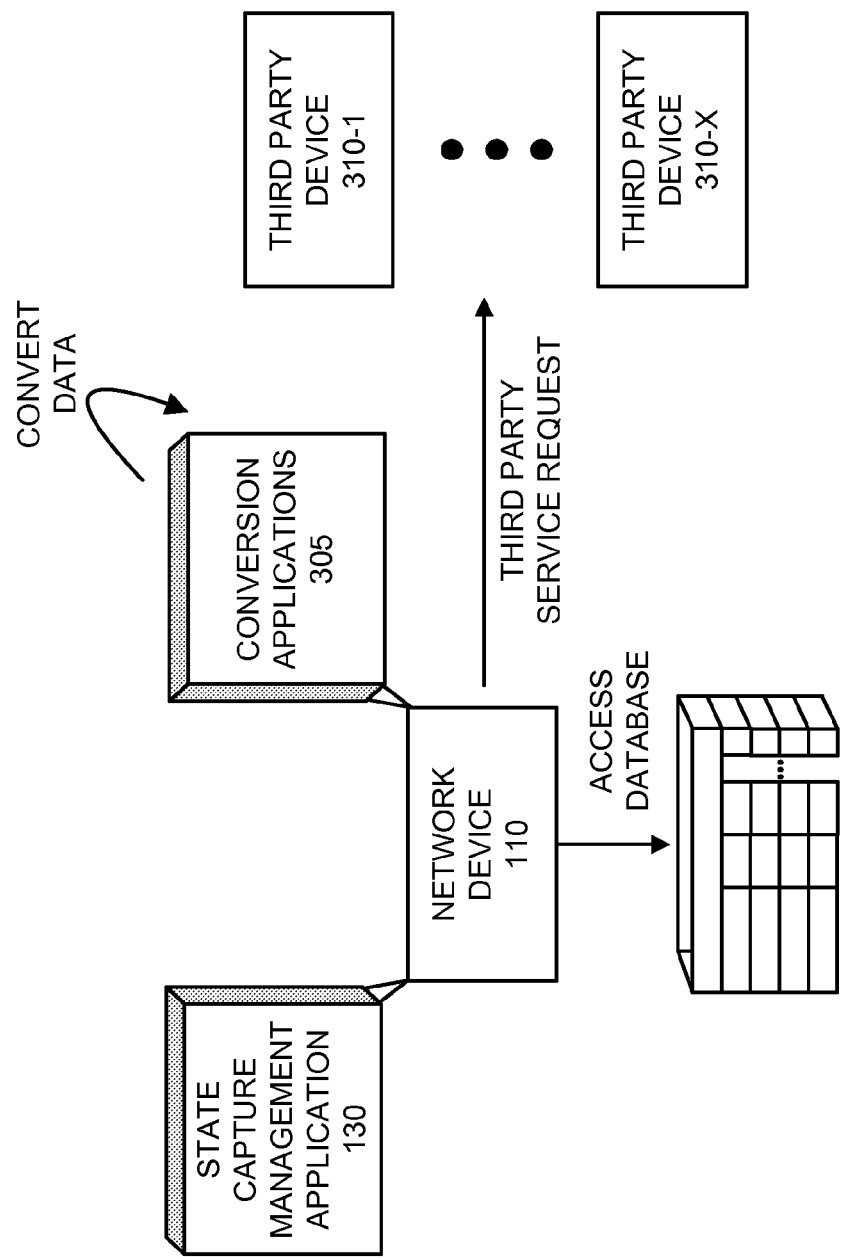
FIG. 3D is a diagram illustrating an exemplary process in which data associated with state capture information is converted for a target user device.

For example, as illustrated in FIG. 3D, network device 110 may convert data using conversion applications 305. For example, conversion applications 305 may include different conversion applications 305 depending on the particular type of application associated with the data or the particular version of the application thereof. Alternatively, network device 110 may generate a third party service request to one of third party devices 310-1 through 310-X (referred to as third party devices 310 or third party device 310). Similar to a function call, network device 110 may transmit the data to be converted to third party device 310 and receive the converted data to be forwarded to user device 120.

According to an exemplary embodiment, conversion services may take place when network device 110 receives the state capture information from the source user device. For example, according to an exemplary implementation, when user devices are linked, network device 110 may identify, based on information obtained during the registration process, differences in application(s), operating systems, etc., between the two linked user devices. In this way, network device 110 may have the data converted, in some cases, before the state capture information is requested by the target user device. According to such an implementation, latency resulting from the time to perform the conversion process may be avoided.

According to another exemplary implementation, if the request to store state capture information includes a target user device identifier, network device 110 may have data converted based on this information. According to another implementation, network device 110 may have data converted when a request by another user device 120 is received, as illustrated in FIG. 3C, when a user responds to a user prompt, when a connection process between network device 110 and user device 120 occurs, etc. According to such an implementation, resource utilization may be minimized by avoiding unnecessary conversion of data that is not subsequently used by the user.

Figure 4:
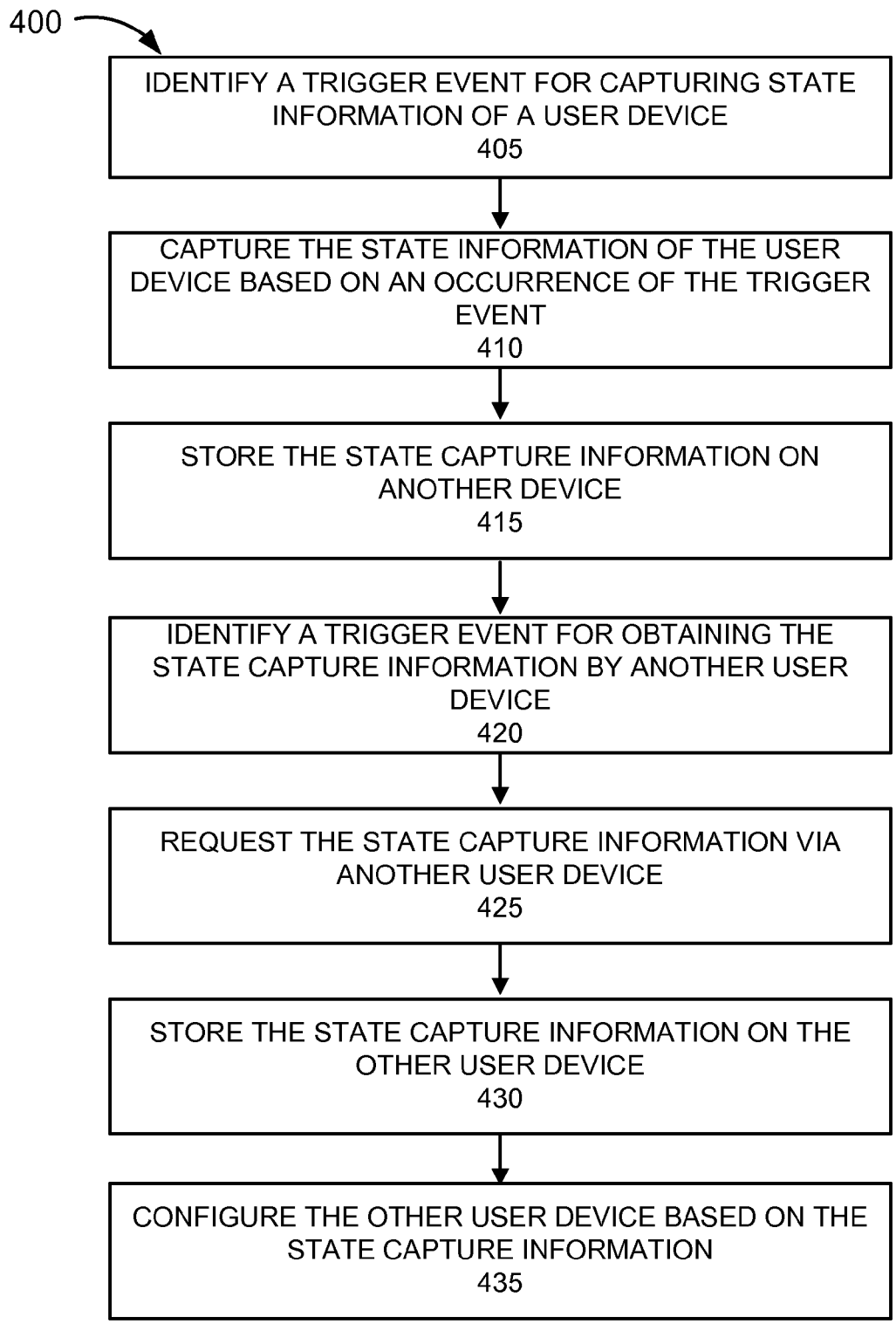
FIG. 4 is a flow diagram illustrating an exemplary process for providing state capture services.

FIG. 4 is a flow diagram illustrating an exemplary process 400 for providing state capture services. According to an exemplary embodiment, network device 110 or user device 120 may perform one or more of the steps described in process 400. For example, processor 205 may execute an application 215 to perform the steps described.

Referring to FIG. 4, in block 405, a triggering event for capturing state information of user device 120 is identified. For example, as previously described, the triggering event may be a timer-based event, a user-input event, or a user device-based event. With reference to a timer-based event, state capture application 125 may use, for example, the internal clock associated with user device 120 (e.g., a system clock) as a time reference for time-based captures (e.g., a periodic state capture, a specific time state capture (e.g., at 8:00 p.m.), etc.). With reference to a user input event, state capture application 125 may identify various user inputs as a triggering event. For example, when a user input is received to save, navigate, create a window-based event (e.g., move a window, resize a window, close or minimize a window, etc.), launch or close an application, etc. Additionally, other types of events may constitute a triggering event, such as the user device-based event. For example, when user device 120 enters a power saving mode (e.g., sleep, hibernation, etc.) or a shutdown process, or when communication-related events occur (e.g., receiving or sending an email, an instant message, etc.), state capture application 125 may capture state information.

According to an exemplary embodiment, the user may set user preferences pertaining to the type of events that trigger a state capture and/or time periods to which state captures will occur. Additionally, or alternatively, state capture application 125 may provide default settings.

In block 410, the state information of user device 120 is captured based on an occurrence of a triggering event. For example, as previously described, the occurrence of a triggering event causes state capture application 125 to perform a capture of state information associated with user device 120. The state capture may be a complete state capture or a partial state capture. According to an exemplary embodiment, the user may set user preferences pertaining to the extent of the state capture (e.g., complete or partial). With reference to partial state captures, according to an exemplary implementation, the user may identify particular application(s) for state capture, include or not include window parameters (e.g., position of window, size, etc.), etc.

In block 415, the state capture information of user device 120 is stored on another device. For example, as previously described, user device 120 provides the state capture information to network device 110. Alternatively, according to another embodiment, user device 120 provides the state capture information to mobile device 160.

In block 420, a triggering event may be identified for obtaining the state capture information by another user device 120. As previously described, the triggering event may correspond to a start-up or power-up process of another user device 120, a launching of an application by the other user device 120, or the triggering event may be based on user preferences, user history, a response to a user prompt, or connection state with network device 110.

In block 425, the state capture information is requested by another user device 120. According to this example of process 400, as previously described, the other user device 120 requests state capture information from network device 110. The request may be based on a user preference associated with state capture application 125. According to other embodiments, the same user device 120 may request the state capture information. According to still other embodiments, network device 110 may automatically push (e.g., transmit) the state capture information to user device 120.

In block 430, the state capture information is stored by the other user device 120. For example, as previously described, state capture application 125 stores the state capture information in memory/storage 210.

In block 435, the other user device 120 is configured based on the state capture information. For example, as previously described, state capture application 125 of the other user device 120 configures the other user device 120 based on the state capture information.

According to other embodiments, one or more blocks illustrated in FIG. 4 and described as being performed by a device may be performed by another device.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, etc.), a combination of hardware and software (e.g., application 215), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   identifying a trigger event for capturing state information of a user device;
   capturing the state information upon an identified occurrence of the trigger event, wherein the state information includes configuration information applicable to another user device;
   storing the state information in another device;
   obtaining the state information by the other user device; and
   configuring the other user device using the state information.

2. The method of claim 1, wherein the trigger event is a timer-based event, a user input event, or a user device-based event, and the method further comprising:
   transmitting, by the user device, a message to the other device, wherein the message includes the state information and at least one of a user device identifier or an identifier associated with a user of the user device.

3. The method of claim 1, further comprising at least one of:
   converting the state information to a converted state information based on one or more differences between one or more applications of the user device and one or more applications of the other user device; or converting the state information to a converted state information based on a difference between an operating system of the user device and an operating system of the other user device.

4. The method of claim 1, wherein the other device is a mobile device or a network device, and the method further comprising:
registering the user device and the other user device with the network device;
storing identifiers pertaining to one or more applications associated with the user device and the other user device; and
storing identifiers pertaining to an operating system associated with the user device and the other user device.

5. The method of claim 1, further comprising:
displaying a prompt, by the other user device, wherein the prompt includes a user request as to whether the other user device is to obtain the state information.

6. The method of claim 1, further comprising:
receiving a request for the state information;
correlating information included in the request with the state information; and
transmitting the state information to the other user device when the information included in the request correlates with the state information.

7. The method of claim 1, further comprising:
transmitting user login information to the other device;
receiving a user input that corresponds to the trigger event;
identifying the user input as the trigger event; and
transmitting the state information to the other device.

8. The method of claim 1, wherein the state information corresponds to a partial state of the user device.

9. A device comprising:
a communication interface;
one or more memories that store instructions; and
one or more processors to execute the instructions and configure the one or more processors to:
receive, via the communication interface, state information associated with a user device, wherein the state information includes configuration information applicable to another user device;
store the state information based on user account information associated with the user device or a user associated with the user device; and
release the state information to the other user device based on the user account information associated with the other user device or a user associated with the other user device.

10. The device of claim 9, wherein the device includes a server device, and wherein the one or more processors further execute the instructions and configure the one or more processors to:
receive a request from the other user device for the state information.

11. The device of claim 9, wherein the device is a network device, and the one or more processors further execute the instructions and configure the one or more processors to:
convert the state information to a converted state information based on one or more differences between one or more applications of the user device and one or more applications of the other user device.

12. The device of claim 9, wherein the one or more processors further execute the instructions and configure the one or more processors to:
receive, via the communication interface, state information associated with a computational device;
store the state information, associated with the computational device, based on a user account information associated with the computational device or a user associated with the computational device;
receive, via the communication interface, a request for the state information associated with the computational device;
identify the state information, associated with the computational device, based on the user account information associated with the computational device; and
transmit, via the communication interface, the state information associated with the computational device, to the computational device when the state information associated with the computational device is identified.

13. A device comprising:
a communication interface;
one or more memories that store instructions; and
one or more processors to execute the instructions and configure the one or more processors to:
identify one or more trigger events for capturing state information of the device, wherein at least one of the one or more trigger events is one of a timer-based event or a user input-based event;
capture the state information upon an identified occurrence of at least one of the one of more trigger events, wherein the state information includes configuration information applicable to another device;
store the state information; and
transmit, via the communication interface, the state information to a mobile device or a network device.

14. The device of claim 13, wherein the one or more processors further execute the instructions and configure the one or more processors to:
store one or more user preferences pertaining to the one or more trigger events; and
store one or more user preferences pertaining to the state information, wherein one of the one or more user preferences pertaining to the state information includes whether the state information captured is a complete state information or a partial state information.

15. The device of claim 13, wherein the one or more processors further execute the instructions and configure the one or more processors to:
receive, via the communication interface, state information associated with another device, from the mobile device or the network device; and
configure the device based on the received state information.

16. The device of claim 13, wherein the device is one of a desktop computer or a laptop computer, and the one or more processors further execute the instructions and configure the one or more processors to:
receive, via the communication interface, state information from the mobile device via a docking station or the network device; and
configure the device based on the received state information.

17. A non-transitory storage medium storing instructions executable by a computational device, wherein the instructions include instructions for:
identifying one or more trigger events for capturing state information of the computational device, wherein at least one of the one or more trigger events is one of a timer-based event or a user input-based event;
capturing the state information upon an identified occurrence of at least one of the one of more trigger events, wherein the state information includes information capable of configuring another device;

storing the state information; and transmitting the state information to a device.

18. The non-transitory storage medium of claim 17, further storing instructions for:

prompting a user of the computational device whether to obtain state information of the device and from the device; and receiving a user input in response to a prompt; and obtaining or not obtaining the state information of the device based on the user input.

19. The non-transitory storage medium of claim 17, further storing instructions for:

storing one or more user preferences pertaining to the state information, wherein one of the one or more user preferences pertaining to the state information includes whether the state information captured is a complete state information or a partial state information.

20. The non-transitory storage medium of claim 17, further storing instructions for:

receiving state information from the device; and configuring the computational device based on the received state information.

\* \* \* \* \*